United States Patent [19]

Turner

[11] Patent Number: 5,056,454
[45] Date of Patent: Oct. 15, 1991

[54] UTILITY LOCATOR

[76] Inventor: Lance H. Turner, 276 E. 4000 North, Provo, Utah 84604

[21] Appl. No.: 369,755

[22] Filed: Jun. 22, 1989

[51] Int. Cl.$^5$ ............................................. G09F 11/04
[52] U.S. Cl. .................................. 116/209; 115/315; 115/317; 115/318
[58] Field of Search ................... 52/103, 105; 40/495; 116/209, 306–309, 311, 315, 318, 325, 326, 316, 317

[56] References Cited

U.S. PATENT DOCUMENTS

| | | | |
|---|---|---|---|
| 191,919 | 6/1877 | Bonner | 52/103 |
| 429,650 | 6/1890 | Scott | 116/209 |
| 2,111,637 | 3/1938 | Mehaffey | 116/308 |
| 2,774,158 | 12/1956 | Tamoschat | 116/317 |
| 3,460,508 | 8/1969 | Baxter | 116/317 |
| 3,511,210 | 5/1970 | Layman | 116/209 |
| 3,523,515 | 8/1970 | Brown | 116/209 |
| 3,568,626 | 3/1971 | Southworth, Jr. | 116/209 |
| 3,633,533 | 1/1972 | Allen | 116/209 |
| 3,927,637 | 12/1975 | Sammaritano | 116/209 |
| 4,127,972 | 12/1978 | Reimoser | 52/103 |
| 4,224,894 | 9/1980 | Haldemann | 116/209 |
| 4,738,060 | 4/1988 | Marthaler et al. | 52/103 |
| 4,886,010 | 12/1989 | Stutzman | 116/308 |

Primary Examiner—William A. Cuchlinski, Jr.
Assistant Examiner—W. Morris Worth
Attorney, Agent, or Firm—Workman, Nydegger & Jensen

[57] ABSTRACT

A utility locator which is positioned on the surface, but which is capable of providing extensive information concerning the character and location of utility facilities, or other similar types of subsurface structures. More particularly, the present invention is capable of providing information at the surface concerning the type of facility located below ground, the depth at which it is buried, its precise location, and its drift or direction of travel. In one embodiment, the utility locator comprises a multiple piece assembly. The manner in which the pieces are assembled and the types of pieces used provide the desired information. In particular, a round center piece may be used which has inscribed on its surface an indication concerning the type of structure marked. A second piece contains a mark on its surface. This mark is positioned with respect to a third piece such that the drift of the underground line is identified. This is accomplished by inscribing on the surface of the third piece the points of the compass. Depth is also indicated in a manner similar to that in which drift is indicated. In one embodiment, the third piece also includes a series of depth indications around its circumference. A fourth piece is then provided whcih also contains a mark. The mark is aligned with the number which corresponds to the depth of the subsurface facility (such as in feet or meters).

25 Claims, 2 Drawing Sheets

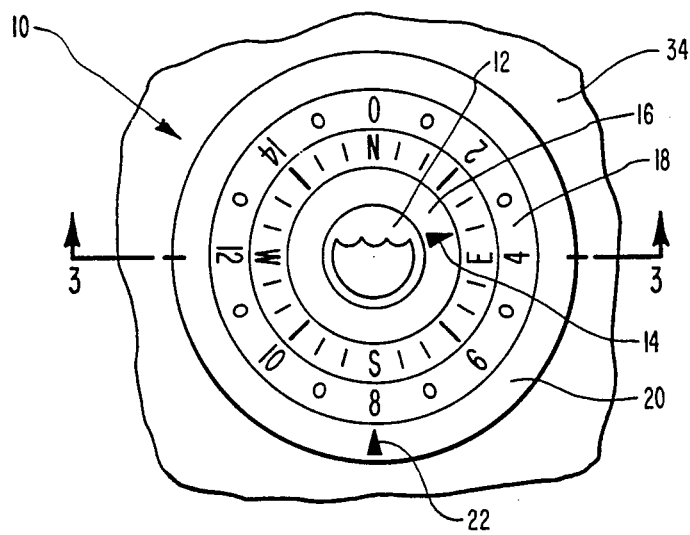
FIG. 1
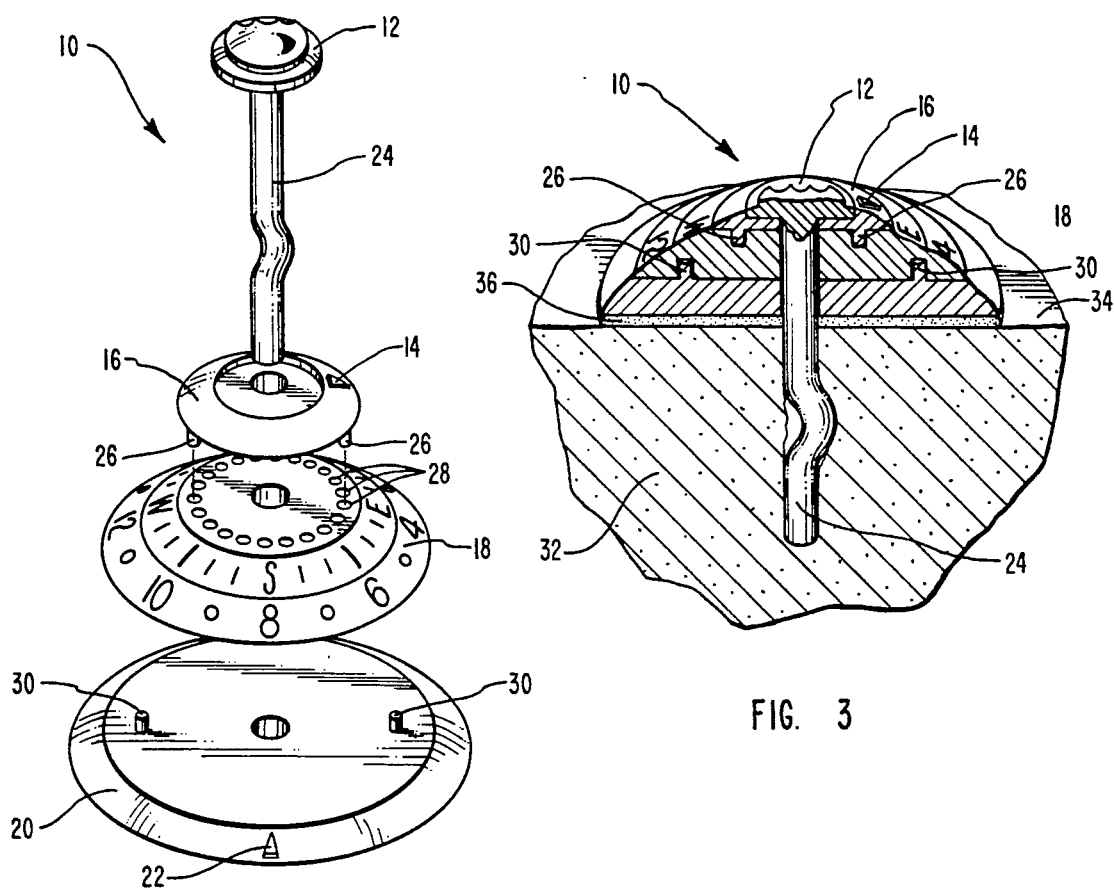
FIG. 2
FIG. 3

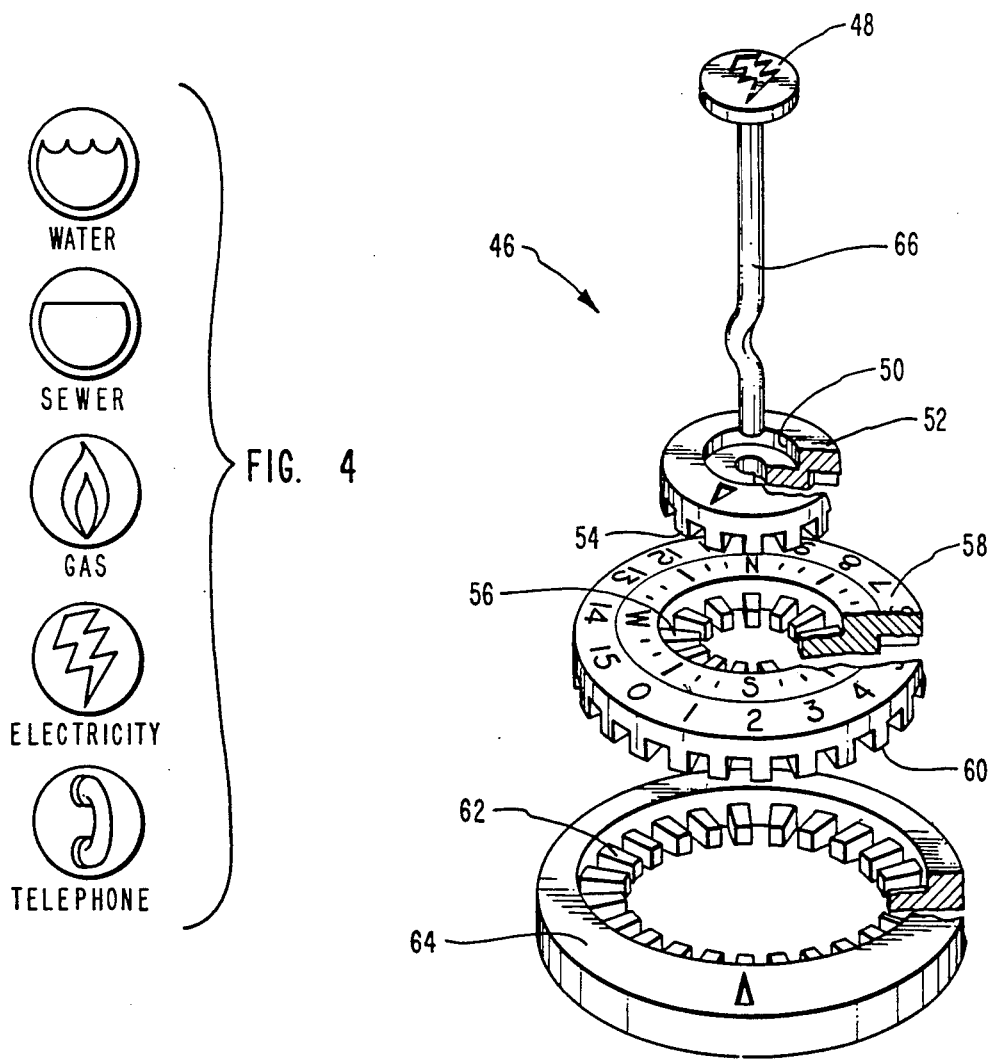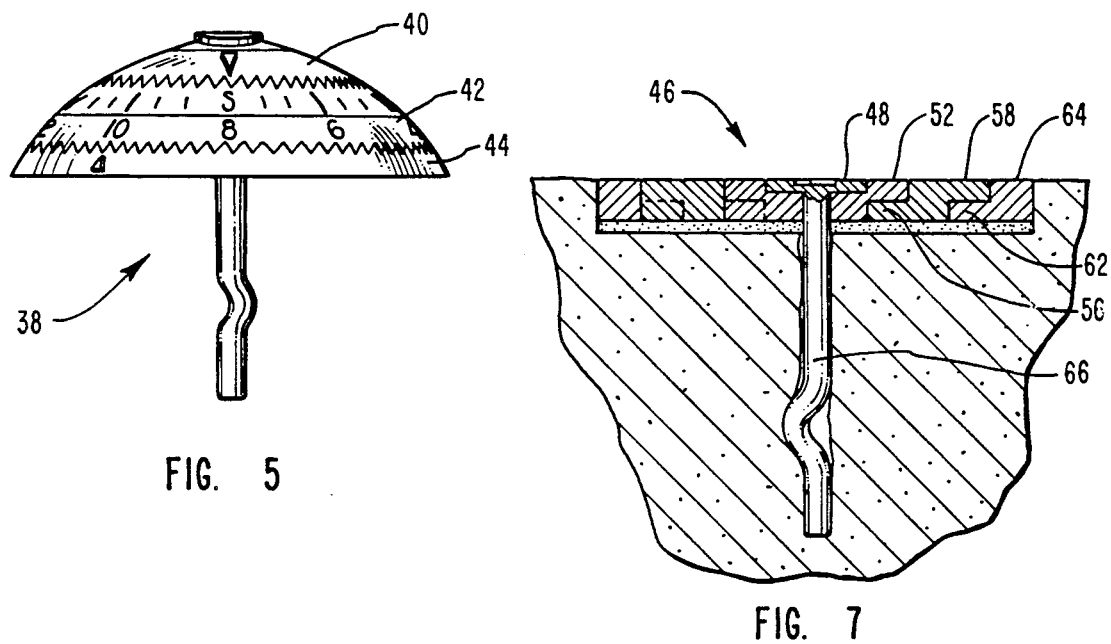

UTILITY LOCATOR

BACKGROUND

1. Field of the Invention

The present invention relates to a utility locator system. More particularly, the present invention relates to a utility locator which is installed on the surface above a utility installation and which is capable of providing information concerning the type of utility installation, the depth of the installation, and the direction of drift of the utility installation.

2. Background of the Invention

One of the constant problems plaguing the utility industry, the construction industry and others in related areas is how to locate buried structures, such as utility installations. It is obvious that it is often necessary to locate underground utility facilities for various reasons. For example, during new construction where an excavation is required, utility facilities must be located in order to avoid damage to the underground utility installation by the excavation equipment and resulting service outages and construction delays. Failure to locate lines during construction and excavation of any kind can lead to serious results. For example, severing a gas line during construction can lead to the release of hazardous quantities of natural gas that can in turn lead to fires, explosions and resulting property damage and personal injury.

Utilities must also commit substantial resources simply to the location of utility lines. Utilities must perform periodic maintenance on certain types of facilities. Utilities are constantly in the process of expanding and upgrading their systems. In order to do so it is necessary for them to locate existing facilities in order to add new facilities or to replace outdated lines and the like.

Most utilities also have programs whereby they will locate utility lines at no charge for individuals interested in doing excavation. For example, if an individual wishes to excavate in order to start a garden, do other types of landscaping, or to do minor construction projects, utilities are generally willing to send a crew to the site in order to locate utility facilities. The same is true with regard to commercial excavation for construction projects. These programs are instigated in order to assure that lines are not damaged, service is not interrupted, and dangerous situations are avoided. Such programs, however, are clearly expensive. Such programs produce no direct revenues to the utilities and, therefore, must be subsidized by other aspects of the utility business. Accordingly, efficiency in the location of utility facilities underground is of great interest in the utility industry.

Various methods have been devised to allow an individual to locate underground structures, such as subsurface utility installations. One such method is simply to locate a permanent monument or stake on the surface above a particular utility installation. Such stakes can take various forms. For, example domed metal pieces have been anchored into the ground in order to locate various subsurface structures. For some uses simple wooden stakes have been placed on the surface above a particular underground structure.

While stakes and surface monuments of this type have been found somewhat useful in locating the general location in which a subsurface structure is located, they are also extremely limited in the information that they typically provide. These devices simply provide information concerning the general location of a structure. Such devices are often temporary and moveable, such that in subsequent excavations in the same area it is necessary to again have the utility crew determine the exact location of the facility.

Conventional stakes often do not indicate the type of utility facility located in a particular location. The precise type of underground facility is often of great importance. For example, excavation over a gas line may be conducted differently than excavation over telephone lines.

It is also generally necessary to determine the "drift" or direction of travel of the line through an area. This allows, for example, a construction crew to determine how the line traverses the construction site. Construction can then be planned accordingly. Simple surface stakes do not provide this information unless multiple stakes are employed. It is typically necessary for a utility, construction company or other interested party to place numerous stakes in order to clearly define the path of travel of the line.

There have been a number of other attempts to deal with the problem of locating underground structures. In some devices, for example, a tape measure or other similar type of measuring line is attached directly to the subsurface utility line. The tape measure is then anchored at the surface above the line by a stake, monument or other similar means. Accordingly, it is possible to determine both the depth of the line and one point of its location.

This type of device is also subject to several limitations and problems. For example, while it may be possible to determine location and depth of the utility line, it is not possible to determine the type of line or the drift and direction of travel of the line. In addition, it is difficult to install this type of device. It is necessary to attach the tape measure or other line directly to the underground line itself. Thus, extra caution is required in burying the line in order to avoid damage to the tape measure and to assure proper placement on the surface. In addition, the fact that the device is attached directly to the underground line increases the possibly of failure. Any movement of the line or the surface could result in breakage of the tape measure line and possible damage to the utility line itself.

Another alternative attempt to find a solution to this problem has been to bury a metal foil or wire with the utility line. Once this material is in place, it can be detected from the surface by a metal detector. The limitations of this type of system are obvious. It is necessary to employ a separate metal detector in order to locate the line. It is not possible to locate the line from the surface without the use of special equipment. In addition, no information is provided as to the type of facility located below ground and only a very generally concept of the depth of the line is obtainable using a surface metal detector.

As mentioned above, at least four separate types of information are required in order to adequately identify and locate underground structures, such as utility facilities. These types of information include the exact type of facility located below ground, the location of the facility, the drift or direction of travel of the line, and the depth at which the line is buried. None of the devices now in use adequately provide this type of information in a reliable and easily accessible manner.

Additional problems presently encountered comprise administrative problems associated with the location of subsurface structures. It is often necessary to first search utility or municipal records in order to obtain the approximate location of the facilities. It is next necessary to travel to the scene, locate appropriate monuments such as property line markers, and then to measure from the monuments in order to approximate the location of the structure. Even after going through these steps, the four types of information identified above are not adequately provided. It is very likely that drift of the line is only approximately, as is the depth at which the line is located. It may not even been possible to fully identify the types of utility facilities buried, in that facilities not found in the search could also traverse the subject area.

Accordingly, it would be a major advancement in the art to provide a device, and system for its use, which overcame the problems currently encountered in the art. It would be a significant advancement in the art if a surface monument could be provided that provided sufficient, accurate data to allow one to locate underground structures. Specifically, it would be an advancement in the art to provide such a device which provided information concerning the type of structure located below ground, the location of the structure, the drift or direction of travel of the subsurface structure, and the depth at which the structure is located. It would also be an advancement in the art if all of this information were immediately available at the surface, without the need to employ special equipment.

Such a device and methods for its use are disclosed and claimed herein.

BRIEF SUMMARY AND OBJECTS OF THE INVENTION

The present invention relates to a utility locator which is positioned on the surface, but which is capable of providing extensive information concerning the character and location of utility facilities, or other similar types of subsurface structures. More particularly, the present invention is capable of providing information at the surface concerning the type of facility located below ground, the depth at which it is buried, its precise location, and its drift or direction of travel. This information makes location of the structure simple and requires no special equipment or tools.

In a preferred embodiment of the present invention, the utility locator comprises a multiple piece assembly. The manner in which the pieces are assembled and the types of pieces used provide the desired information. In particular, a round center piece may be used which has inscribed on its surface an indication concerning the type of structure marked.

A second piece contains a mark on its surface. This mark is positioned with respect to a third piece such that the drift of the underground line is identified. This is accomplished by inscribing on the surface of the third piece the points of the compass. For example, north, south, east and west are designated. Other intermediate directions (north northwest, northwest, and west northwest, and the like) can also be shown or represented by lines or circles inscribed on the surface of the third piece. Thus, the mark will be located such that it points to the appropriate direction of drift of the utility facility.

Depth is also indicated in a manner similar to that in which drift is indicated. In one embodiment, the third piece also includes a series of depth indications around its circumference. For example, numbers between one and fifteen could be equally spaced around the third piece. A fourth piece is then provided which also contains a mark. The mark is aligned with the number which corresponds to the depth of the subsurface facility (such as in feet or meters).

Accordingly, it will be appreciated that such a device provides all of the information necessary to locate the underground facility and does so in a manner which is easy to read and which can be used without the necessity of employing special equipment.

An alternative to providing the four concentric rings would be to provide a series of utility locators with various combinations of the desired information inscribed on a single piece. The multiple piece embodiment has a number of advantages, however, in that a single device can be custom fit to a wide variety of situations. In order to install the device at any particular location it is a simple matter to insert the appropriate first piece having the designation of the appropriate facility. Then the marks can be aligned such that depth and drift are also indicated for the precise location in question.

Numerous means of attaching the pieces are available and are deemed to be part of the present invention. For example, the pieces can be held together by pins secured to some or all of the pieces which in turn seat in corresponding recesses in the other pieces. Alternatively, serration can be provided which engage corresponding serration on the other pieces.

Accordingly, it is a primary object of the present invention to provide a utility locator which overcomes the problems encountered in the existing art.

More particularly, it is an object of the present invention to provide a utility locator which provides sufficient information at the surface to allow subsurface structures to be adequately located and identified.

It is a related object of the present invention to provide a surface utility locator which provides information concerning the type of facility located below, the location of the facility, the drift or direction of travel of the underground facility, and the depth at which the facility if located.

These and other objects and advantages of the present invention will become apparent upon reference to the drawings, the following description of the invention, and the appended claims.

BRIEF DESCRIPTION OF THE DRAWINGS

FIG. 1 is a top perspective view of one embodiment of the present invention.

FIG. 2 is a side exploded view of the device illustrated in FIG. 1.

FIG. 3 is a side cross sectional view of the device illustrated in FIG. 1 showing the device as installed.

FIG. 4 comprises top plan views of various configurations of the center piece of the device as shown in FIG. 1.

FIG. 5 is a side cross sectional view of an alternative embodiment of the device.

FIG. 6 is a side exploded view of still another embodiment of the device of the present invention.

FIG. 7 is a side cross sectional view of the device illustrated in FIG. 6.

DETAILED DESCRIPTION OF THE PREFERRED EMBODIMENTS

Reference is now made to the Figures wherein like parts are designated with like numerals throughout.

Referring more particularly to FIG. 1, one embodiment of the utility locator of the present invention is illustrated and generally designated 10. The utility locator of the present invention is particularly adaptable for placement on the surface above buried utility facilities and the like. However, it will be appreciated that the present invention could be employed to mark any other type of underground structure, whether manmade or natural. For example, the present invention may find application in mining as a method of marking certain mineral structures located below ground.

As illustrated in FIG. 1, utility locator 10 has a generally round outside diameter, however, other configurations of the device could also be made and are considered to be within the scope of the present invention. In its integral assembled configuration, the utility locator 10 may be formed of a plurality of generally concentric rings. As will be discussed in further detail below, the concentric rings are formed by assembling various pieces of the device in order to form an integral whole when assembled.

The center piece 12 of the device 10 as illustrated in FIG. 1 provides information concerning the type of facility located below ground. For example, there are common emblems for water, sewer, gas, electric, and telephone facilities. Such common emblems are preferably inscribed on the center piece 12 of the device 10 when the device 10 is fully assembled. As illustrated, center piece 12 is generally disk shaped, having post 24 (illustrated in FIGS. 2 and 3) attached to its underside.

The next concentric ring out from the center in the embodiment of the device as illustrated in FIG. 1 contains an arrow or mark 14. The second concentric piece is designated 16 in FIG. 1. The mark 14 on second concentric piece 16 is positioned in the assembled device such that when it cooperates with the third concentric piece 18 it provides a direct indication of the direction of drift (or general direction of placement) of the utility facilities located below ground.

Third concentric piece 18 forms the next concentric area outwardly from the center of the assembled device 10. As illustrated in FIG. 1, third piece 18 has inscribed on its face the various points of the compass. Specifically, north, east, south and west are designated by their usual letter abbreviations. Intermediate directions (north northeast, north east, east northeast, etc.) are also indicated by dots or circles inscribed on the face of third concentric piece 18.

Also inscribed on the face of third concentric piece 18 are a series of depth indications. As illustrated in the embodiment of the device illustrated in FIG. 1, these depth indications take the form of a series of numbers from 1 to 15 around the perimeter of the face of third concentric piece 18. These depth indications can be in any convenient system of measurement. It is anticipated that for most common uses, it would be sufficient to give depth indications in feet or meters.

The final feature of the device 10 illustrated in FIG. 1 comprises fourth concentric piece 20. Inscribed on the face of fourth concentric piece 20 is a mark or arrow 22. Mark 22 is positioned with respect to third concentric piece 18 such that it points to the number inscribed on third concentric piece 18 which corresponds to the depth of the facilities located below device 10.

From FIG. 1 it is apparent that device 10 provides the user with extensive information concerning the subsurface structure located below device 10. Center piece 12 tells the viewer the type of facility located below ground. Typical types of facilities will include water lines, sewer lines, electrical facilities, telephone lines, and natural gas pipelines. Thus, a viewer is easily able to identify the type of facility that he may be excavating.

Next the viewer is able to determine the direction of drift of the underground facility across the subject area. This determination is made by comparing the location of mark 14 on second concentric piece 16 with the direction indication given on the face of third concentric piece 18. As shown in FIG. 1 the viewer is easily able to determine that the facilities travel in a generally easterly direction from the point of the utility locator 10.

Likewise, the viewer is able to determine the precise depth of the buried structure. By comparing the position of mark 22 on fourth concentric piece 20 with the depth indications inscribed on the face of third concentric piece 18 it is a simple matter to determine the exact depth of the subsurface structure. For example, in FIG. 1 the indication is that the structure is located 8 units (feet) below the surface, because the mark 22 is pointing toward the 8 on the third concentric piece 18.

Referring now to FIG. 2, the utility locator 10 of FIG. 1 is illustrated in an exploded view. One method of assembly of the device can be appreciated with reference to FIG. 2. FIG. 2 shows the center piece 12. As mentioned above, this piece is generally a disk having a post securely attached to its underside and extending downwardly therefrom. The post 24 is used to secure the utility locator in place on the surface in the manner described in greater detail below.

The structure of second concentric piece 16 can be more fully appreciated with reference to FIG. 2. Second concentric piece 16 is a generally frustoconical disk having an opening disposed through its center such that post 24 can pass through. Center piece 12 fits in place on the top face of second piece 16. As mentioned above, on the outer diagonal face of second piece 16 is inscribed an arrow or other similar type of mark. This mark is oriented with respect to third concentric piece 18 in such a manner as to indicate the direction of drift of the subsurface facility.

Extending generally downwardly from the bottom face of second piece 16 are one or more pins 26. Pins 26 are configured such that they can be received in recesses 28 disposed in the upper face of third piece 18. By appropriately orienting pins 26 and recesses 28 it is possible to securely position mark 14 in the desired location.

As illustrated in FIG. 2, third concentric piece 18 also comprises a generally frustoconical disk. As mentioned above, a series of recesses are disposed in the upper face of third piece 18 in order to receive pins 26. As described above, along the outer diagonal face of third piece 18 are inscribed the various points of the compass and the indications of depth.

Finally, fourth concentric piece 20 is also illustrated in FIG. 2. Fourth piece 20 is also generally frustoconical in configuration. Protruding upwardly from the upper face of fourth piece 20 are one or more pins 30. Pins 30 are positioned on the upper face of fourth piece 20 in such a manner as to correspond to recesses in the underside (not shown) of third piece 18. Thus, by properly orienting the pins 30 and the corresponding recesses it is possible to direct mark 22 toward the proper depth indication on third piece 18.

The utility locator as fully assembled and installed is illustrated in FIG. 3. The manner in which the integral assembly of the various pieces is achieved can be fully appreciated. Interior ring 12 is positioned at the top of the generally dome shaped assembly. Protruding downwardly through the device is post 24. Post 24 can be slightly curved in the general area of its distal end. This allows the post to be securely installed in the ground 32. When post 24 is secured in this manner, the various pieces of the device are restrained from moving with respect to one another.

FIG. 3 also illustrates the manner in which pins 26 and pins 30 seat within corresponding recesses. This, along with the restraint on movement provided by post 24 assures that the device as assembled will retain the desired orientation in order to provide the necessary information.

In order to adequately hold the device in place on the surface 34 of the ground 32 it may be desirable to apply a layer of adhesive 36 prior to installing the device. This layer of adhesive provides additional assurance that the device 10 will remain in the desired position.

FIG. 4 provides an illustration of some of the possible designs which could be included on the face of interior ring 12. These designs are easily recognizable representations of the types of facilities which are located beneath any particular embodiment of the device. These designs immediately alert the user of the type of utility which he will encounter when excavating. The types of facilities represented in FIG. 4 include water, sewer, gas, electricity and telephone.

FIG. 5 is a cross sectional representation of an alternative embodiment of the device, and is generally designated 38. Utility locator 38 is in all respects similar to utility locator 10, with the exception that it is held together as an integral structure using alternative means. As can be seen in FIG. 5, second concentric piece 40, third concentric piece 42 and fourth concentric piece 44 each have serration disposed on their upper surface, lower surface, or in the case of third piece 42, both its upper and lower surfaces. The serration on each piece correspond directly to serration on at least one neighboring piece. Thus, it is a simple manner to align the pieces of the device in an adequate manner to provide an integral assembled device which provides all of the necessary and desired information. Again, the various pieces of the device are held securely in place by the center piece 41 and its attachment to post 43, which is in turn attached securely when the device 38 is in use.

An alternative embodiment of the device is illustrated in FIG. 6. This embodiment includes pieces which are analogous to the pieces of each of the previously described embodiments. The primary difference between this embodiment and the others is the manner in which the various pieces are assembled. In this embodiment the pieces are provided with teeth which in turn engage adjacent pieces to form an integral assembly of utility locator 46.

As with the other embodiments, locator 46 includes a centered piece 48 which carries on its upper face a designation of the type of utility which is buried beneath the device. Center piece 48 in turn seats within a recess 50 disposed in the upper face of second piece 52. On the underside of second piece 52 are a series of teeth 54. Teeth 54 are in turn, designed so that they fit within teeth 56 on third piece 58. The underside of third piece 58 also has teeth 60 which are configured such that they can fit into corresponding teeth 62 on fourth piece 64.

Again, this embodiment of the device may be held together with the help of post 66 which extends downwardly from the underside of center piece 48.

The manner in which the device 46 is assembled can be more fully understood with reference to FIG. 7. FIG. 7 is a cross sectional view which provide a better understanding concerning the manner in which the various pieces engage one another to form a single integral structure.

Using the embodiment of the device shown in FIG. 7 it will be appreciated that the device can easily be configured to provide a flat upper surface with corresponds to the level of the ground. Thus, the device does not create an obstruction which can interfere with activities above ground, such as automobile traffic, lawn mowers, street sweepers, snow plows and the like.

Various other embodiments of the invention are of course possible. For example, it is within the scope of the present invention to provide a similarly structured device which would reside above ground on a specially configured post. Such a device would be particularly useful in rural areas where it may be somewhat difficult to locate an indicator at the surface.

The utility locator can be constructed of any suitable and desirable material. Since the utility locator will most likely be placed out-of-doors, a material that can withstand the elements will likely be preferred. For example, the device may be constructed of a metal that does not readily rust or deteriorate. Stainless steel, brass or other similar materials may be used. Alternative plastics may also be easily adapted for use in the present invention.

Accordingly, it will be appreciated that the present invention accomplishes each of the objects of the invention and overcomes many of the limitations of existing devices. The present invention is capable of providing information concerning the type of subsurface structure, the precise depth of the structure, the location of the structure, and the drift of the structure as it runs through a particular area of interest. All of this information is provided in a readily available manner which does not require any special detecting device.

The device of the present invention will be of particular importance in emergency situations. Such situations could, for example, occur when a gas line is broken by excavation or by natural occurrences such as earth quakes. The present invention provides readily available means for immediately locating such a damaged line so that repairs can take place before fire or explosion is encountered. Similar uses can readily be imagined for all types of utilities and for various possible situations.

As discussed above, the present invention is capable of avoiding major administrative problems. Presently it is a difficult administrative task to research and locate lines. Utilities, municipalities, and private companies and individuals expend significant time and effort in this regard. Thus, the time savings of using the present invention are apparent.

Similarly, the present invention is easy to install. It is simply necessary for the installer to set the device so that the correct information is shown. This can be done with very little training and by a relatively unskilled worker. Thus, it can be seen that the present invention provides a significant contribution to the art.

It should be appreciated that the apparatus and methods of its use of the present invention are capable of being incorporated in the form of a variety of embodiments, only a few of which have been illustrated and described above. The invention may be embodied in other forms without departing from it spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A utility locator for providing upon inspection from the surface of the ground preselected information about a utility buried in the ground, said locator comprising:
   (a) a multiple piece assembly comprising:
      (i) a first piece having thereon a first means for indicating the type of the utility,
      (ii) a second piece having thereon a second means for cooperating within said multiple piece assembly to selectively indicate the drift of the utility,
      (iii) a third piece carrying thereon a third means for cooperating with said second means to selectively indicate the drift of the utility and a fourth means for cooperating within said multiple piece assembly to selectively indicate the depth of the utility, said second and third pieces being capable of being positioned with respect to one another, such that the direction of drift of the utility is indicated by the relative positions of the second and third means, and
      (iv) a fourth piece carrying thereon a fifth means for cooperating with said fourth means to selectively indicate the depth of the utility, said fourth piece being capable of being positioned with respect to said third piece, such that the depth of the utility is indicated by the relative positions of the fourth and fifth indication means;
   (b) first fixation means for fixing the relative positions of said second and third pieces;
   (c) second fixation means for fixing the relative positions of said third and fourth pieces; and
   (d) means for securing the multiple piece assembly to the surface of the ground above the utility.

2. A utility locator as defined in claim 1 wherein the means for securing comprises an adhesive.

3. A utility locator as defined in claim 1 wherein the utility locator is constructed of a material which does not readily deteriorate when placed in the out-of-doors.

4. A utility locator as defined in claim 1 wherein the utility locator is constructed of metal of a type that does not rust readily.

5. A utility locator as defined in claim 1 wherein the utility locator is constructed of plastic.

6. A utility locator as defined in claim 1 wherein the integral assembly comprises an essentially dome-shaped structure above the surface of the ground having an essentially flat underside.

7. A utility locator as defined in claim 1 wherein the integral assembly comprises a disk-shaped structure having an essentially annular outer diameter and essentially flat upper and lower faces.

8. A utility locator as defined in claim 1, wherein one of said second and third means comprises the points of the compass inscribed on the corresponding one of said second and third pieces, respectively.

9. A utility locator as defined in claim 8, wherein the other of said second and third means comprises a designation capable of indicating the appropriate one of said points of the compass corresponding to the drift of the utility and being inscribed on the other of said second and third pieces.

10. A utility locator as defined in claim 1, wherein one of said fourth and fifth means comprises an inscription on the corresponding one of said third and fourth pieces designating a range of potential depths of the utility.

11. A utility locator as defined in claim 1, wherein said first means comprises a designation of the type of the utility inscribed on said first piece.

12. A utility locator as defined in claim 1, wherein said means for securing comprises a post attached to said first piece and extending generally downwardly into the ground therefrom through said second, third, and fourth pieces, said post being so configured as to resist removal of said multiple assembly from the surface of the ground, thereby to retain said second, third, and fourth pieces in fixed relative positions with each other.

13. A utility locator as defined in claim 1, wherein said first, second, third, and fourth pieces are generally circular and in said multiple piece assembly are disposed concentrically with each other.

14. A utility locator as defined in claim 11 wherein the first and second fixation means comprises:
   (a) at least one pin secured to one of said second and third pieces, and at least one pin secured to one of said third and fourth pieces; and
   (b) at least one series of corresponding recesses capable of receiving said at least one pins, said series of recesses being located on the other of said second and third pieces and the other of said third and fourth pieces.

15. A utility locator as defined in claim 1, wherein at least one of said first and second fixation means comprises:
   (a) a first serration secured to one of said second, third, and fourth pieces; and
   (b) a corresponding second serration for receiving said first serration, said second serration being located on one of said second, third, and fourth pieces other than said one of said pieces to which said first serration is secured.

16. A utility locator as defined in claim 1, wherein at least one of said first and second fixation means comprises:
   (a) a first series of tooth secured toone of said second, third, and fourth pieces; and
   (b) a corresponding second series of teeth capable of receiving said first series of teeth, said second series of teeth being located on one of said second, third, and fourth pieces other than said one of said pieces to which said first series of teeth is secured.

17. A utility locator as defined in claim 9, wherein said compass points are located on said third piece.

18. A utility locator as defined in claim 10, wherein the other of said fourth and fifth means comprises a designation on the other of said third and fourth pieces capable of indicating with said inscriptions the depth of the utility.

19. A utility locator as defined in claim 18, wherein said inscription designating a range of potential depths of the utility is located on said third piece.

20. A utility locator as defined in claim 13, wherein the portion of said first piece observable from the surface of the ground comprises a circle disposed centrally of said multiple piece assembly.

21. A utility locator as defined in claim 20, wherein the portion of said second piece observable from the surface of the ground comprises a first ring concentrically disposed circumscribing the center piece and having a mark inscribed thereon at a chosen location.

22. A utility locator as defined in claim 21, wherein the portion of said third piece observable from the surface of the ground comprises a second ring concentrically disposed circumscribing the first ring and having the points of the compass inscribed thereon, such that the mark on the second piece can be positioned to designate the particular one of said compass points corresponding to the direction of travel of the utility.

23. A utility locator as defined in claim 22, further comprising a plurality of inscriptions on said second ring corresponding to a range of potential depths of the utility.

24. A utility locator as defined in claim 23, wherein the portion of said fourth piece observable from the surface of the ground comprises a third ring concentrically disposed circumscribes the second ring and having inscribed thereon a mark which can be positioned in such a manner as to indicate the one of said plurality of inscriptions on the second ring corresponding to the depth of the utility.

25. A utility locator as defined in claim 11 wherein the type of designation so inscribed is selected from the group consisting of conventional symbols of water, sewer, gas, electricity, and telephone utilities.

* * * * *